US012519275B2

(12) United States Patent
Tsuchiya et al.

(10) Patent No.: US 12,519,275 B2
(45) Date of Patent: Jan. 6, 2026

(54) CONNECTOR WITH FLOATING MECHANISM

(71) Applicant: SMK Corporation, Tokyo (JP)

(72) Inventors: Hirotaka Tsuchiya, Tokyo (JP); Yoji Ochi, Saitama (JP); Fumio Osawa, Tokyo (JP)

(73) Assignee: SMK Corporation, Tokyo (JP)

( * ) Notice: Subject to any disclaimer, the term of this patent is extended or adjusted under 35 U.S.C. 154(b) by 318 days.

(21) Appl. No.: 18/327,861

(22) Filed: Jun. 1, 2023

(65) Prior Publication Data

US 2024/0120693 A1 Apr. 11, 2024

(30) Foreign Application Priority Data

Oct. 5, 2022 (JP) ................................ 2022-160706

(51) Int. Cl.
*H01R 24/40* (2011.01)
*H01R 13/631* (2006.01)
*H01R 103/00* (2006.01)

(52) U.S. Cl.
CPC ......... *H01R 24/40* (2013.01); *H01R 13/6315* (2013.01); *H01R 2103/00* (2013.01)

(58) Field of Classification Search
CPC .... H01R 24/38; H01R 24/40; H01R 13/6315; H01R 2103/00; H01R 9/05
See application file for complete search history.

(56) References Cited

U.S. PATENT DOCUMENTS 5,456,611 A * 10/1995 Henry ................ H01R 13/6395 439/578
5,516,303 A 5/1996 Yohn
6,224,390 B1 5/2001 Mitani
6,280,214 B1 * 8/2001 Chang .................... H01R 29/00 200/51.1
7,484,965 B2 * 2/2009 Chien .................... H01R 24/50 439/63
7,988,455 B2 * 8/2011 Blakborn ............... H01R 24/40 439/63
8,262,409 B2 * 9/2012 Chang .................. H01R 24/545 439/582
8,905,781 B2 * 12/2014 Chen .................... H01R 13/627 439/63
9,502,835 B2 * 11/2016 Chen ...................... H01R 24/46
(Continued)

FOREIGN PATENT DOCUMENTS

JP H08335483 A 12/1996
JP 2000228256 A 8/2000
(Continued)

OTHER PUBLICATIONS

Office Action issued for counterpart Japanese Application No. 2022-160706, transmitted from the Japanese Patent Office on May 22, 2024 (drafted on May 14, 2024).

*Primary Examiner* — Thanh Tam T Le

(57) ABSTRACT

A connector with a floating mechanism includes a socket movable shell configured to cover an outside of a socket movable housing and to move together with the socket movable housing, and a conductive shell connecting unit configured to constantly provide connection between the socket movable shell and a socket fixing shell, the shell connecting unit being interposed between the socket movable shell and the socket fixing shell.

14 Claims, 12 Drawing Sheets

(56) References Cited

U.S. PATENT DOCUMENTS

| | | | | |
|---|---|---|---|---|
| 9,502,836 | B2 * | 11/2016 | Hashiguchi | H01R 24/50 |
| 9,620,900 | B2 * | 4/2017 | Yanase | H01R 13/6315 |
| 9,692,151 | B2 * | 6/2017 | Kunieda | H01R 24/46 |
| 9,905,968 | B2 * | 2/2018 | Yanase | H01R 13/6315 |
| 10,424,866 | B1 * | 9/2019 | Peng | H01R 24/50 |
| 10,651,593 | B2 * | 5/2020 | Wu | H01R 13/6277 |
| 11,070,013 | B2 * | 7/2021 | Brandt | H01R 24/542 |
| 11,411,341 | B2 * | 8/2022 | Chen | H01R 13/2492 |
| 11,489,300 | B2 * | 11/2022 | Smith | H01R 13/622 |
| 11,569,614 | B2 * | 1/2023 | Tsuchiya | H01R 13/6315 |
| 11,949,195 | B2 * | 4/2024 | Chen | H01R 13/6315 |
| 12,119,580 | B2 * | 10/2024 | Huang | H01R 24/542 |

FOREIGN PATENT DOCUMENTS

| | | | |
|---|---|---|---|
| JP | 2007087682 | A | 4/2007 |
| JP | 2008288120 | A | 11/2008 |
| JP | 6712376 | B1 | 6/2020 |

* cited by examiner

CONNECTOR WITH FLOATING MECHANISM

The contents of the following Japanese patent application(s) are incorporated herein by reference: NO. 2022-160706 filed in JP on Oct. 5, 2022.

FIELD

The present invention relates to coaxial connectors for use in the connection between an electronic device and a coaxial cable, the connection between electronic devices, or the like, and more particularly relates to a connector with a floating mechanism excellent in connectability between a plug and a socket.

BACKGROUND

A socket of this type of coaxial connector is required to include a socket-side center contact arranged in the center of the socket, and a socket-side shell arranged outside the socket-side center contact. When the socket is connected to a plug, both the socket-side center contact and the socket-side shell are required to be appropriately connected to a plug-side center contact and a plug-side shell.

Therefore, even when an axial or radial misalignment occurs between a plug and a socket to be connected with each other due to the positions of the socket and the plug to be mounted on supporting bodies, such as a board incorporated in electronic devices or a chassis, the misalignment needs to be corrected at the time of connecting both coaxial connectors.

Therefore, for the sockets of conventional coaxial connectors, connectors with a floating mechanism are used. Here, the connectors with a floating mechanism include a socket movable housing that is supported movably in a radial direction (xy axis directions) with respect to a socket fixing housing that is fixed to a supporting body, such as a board or a casing.

Some of the connectors with a floating mechanism of this type have been developed so as to include a socket shell that covers an outer circumference and an upper face of the socket fixing housing. When the socket shell is connected with a plug shell, shielding performance is secured while the socket movable housing is allowed to move (see, for example, Patent Literature 1).

CITATION LIST

Patent Literature

Patent Literature 1: Japanese Patent No. 6712376

SUMMARY

Technical Problem

In the conventional technology as described above, the shielding performance is improved by covering the outer circumference and the upper face of the socket fixing housing with the socket shell. However, the socket movable housing that moves on the socket fixing housing is not shielded due to its structure.

On the other hand, the connector with a floating mechanism of this type is required to have high EMC characteristics, and further improvement of the EMC characteristics can be expected if the entire connector including the socket movable housing can be covered with a shielding member made of conductive metal.

Therefore, in light of such conventional problems, the present invention has been made in order to provide a connector with a floating mechanism, capable of improving the EMC characteristics by covering the entire connector including the floating mechanism with a shell.

Solution to Problem

In order to solve the conventional problems as described above, a first aspect of the invention relates to a connector with a floating mechanism, the connector with a floating mechanism being a coaxial connector including a plug and a socket configured to be connected with each other, the plug including a plug center contact, a plug shell configured to be positioned outside the plug center contact, and a plug housing configured to be interspersed between the plug center contact and the plug shell, the socket including a socket center contact, a socket fixing housing configured to be fixed to a support, a socket movable housing configured to be radially movable on a plug-side end face of the socket fixing housing together with the socket center contact, and a socket fixing shell configured to cover an outside of the socket fixing housing, the plug center contact being configured to be connected with the socket center contact while the plug shell is configured to be connected with the socket fixing shell, the connector with a floating mechanism including: a socket movable shell configured to cover an outside of the socket movable housing and to move together with the socket movable housing; and a conductive shell connecting unit configured to constantly provide connection between the socket movable shell and the socket fixing shell, the shell connecting unit being interposed between the socket movable shell and the socket fixing shell.

In a second aspect of the invention, in addition to the configuration of the first aspect, the socket movable housing includes a flange part that configured to protrude outward at a lower end part of a cylindrical housing main body, and the socket movable shell integrally includes a main body cylindrical part configured to cover an outer circumference of the housing main body and an upper face covering part configured to protrude outward from a lower end of the main body cylindrical part to cover an upper face of the flange part.

In a third aspect of the invention, in addition to the configuration of the second aspect, the socket movable shell includes a flange outer circumference covering part configured to be integrally supported by an outer circumferential edge of the upper face covering part to cover an outer circumference of the flange part.

In a fourth aspect of the invention, in addition to the configuration of the first aspect, the shell connecting unit is constituted of a plurality of elastic contact pieces configured to radially project from an outer circumferential part of the socket movable shell, and contact parts formed at tips of the respective elastic contact pieces are made to come into contact with an inner circumferential surface of the socket fixing shell.

In a fifth aspect of the invention, in addition to the configuration of the fourth aspect, the socket fixing housing has floating recess parts formed so as to open to an upper face and to outside and to allow insertion of the elastic contact pieces in a movable manner.

In a sixth aspect of the invention, in addition to the configuration of the fourth aspect, the socket movable housing has avoidance recess parts formed on an outer circumferential surface to allow deformation of the elastic contact pieces.

In a seventh aspect of the invention, in addition to the configuration of the fifth aspect, the socket fixing housing has a slip-down preventing part formed to have a sliding support face that is flush with the plug-side end face between the floating recess parts adjacent in a circumferential direction, and the sliding support face supports a bottom face part of the socket movable housing at a time of floating so as to prevent the socket movable housing from falling into the floating recess parts.

Since the connector with a floating mechanism according to the aspect(s) of the present invention includes the configuration according to the first aspect, the socket movable shell can also be covered with a shell to shield the entire connector, so that the EMC characteristics can be improved.

In the aspect(s) of the present invention including the configuration of the second aspect, the socket movable housing and the socket movable shell can stably be moved, while the socket movable housing can be shielded without any gaps.

Furthermore, in the aspect(s) of the present invention including the configuration of the third aspect, the entire socket movable housing can be shielded, while impedance can be adjusted.

Furthermore, in the aspect(s) of the present invention including the configuration of the fourth aspect, a stable connection between the socket fixing shell and the socket movable shell can be made.

Furthermore, in the aspect(s) of the present invention including the configuration of the fifth aspect, the stable connection between the socket fixing shell and the socket movable shell can be maintained, while the socket movable housing and the socket movable shell can smoothly be moved with respect to the socket fixing housing.

Furthermore, in the aspect(s) of the present invention including the configuration of the sixth aspect, interference between the elastic contact pieces and the socket fixing housing can be prevented, and smooth deformation can be made.

Furthermore, in the aspect(s) of the present invention including the configuration of the seventh aspect, at the time of floating, the socket movable housing can slide in a stable state without inclining with respect to the socket fixing housing.

DESCRIPTION OF EMBODIMENTS

Figure 1:
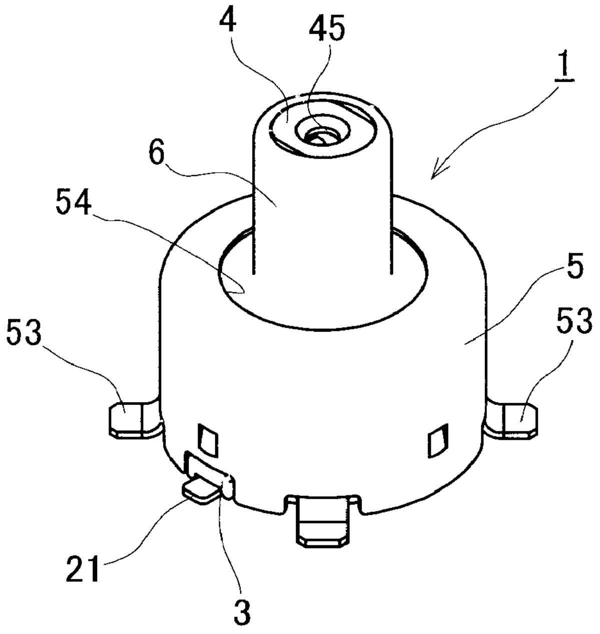
FIG. 1 is a perspective view showing an example of a connector with a floating mechanism according to the present invention.
Figure 2:
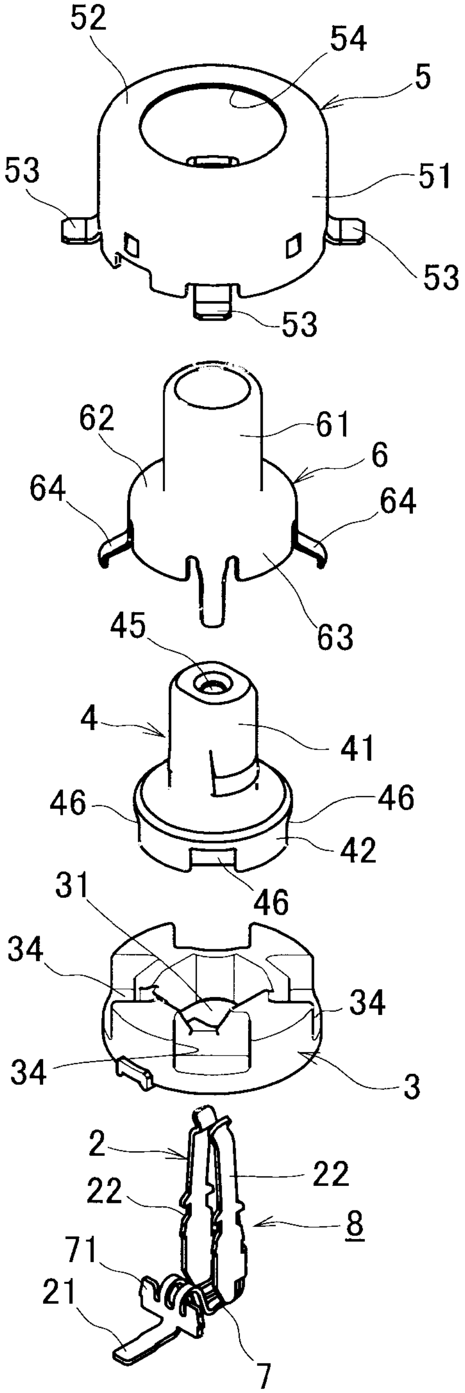
FIG. 2 is an exploded perspective view of the connector with a floating mechanism.

A description will now be given of an embodiment of a connector with a floating mechanism according to the present invention, on the basis of examples shown in FIGS. 1 to 12.

The connector with a floating mechanism includes a plug and a socket 1 that are connected to each other. The floating mechanism allows the plug and the socket 1 to be connected with each other while allowing their misalignment in a radial direction (xy directions) to be corrected.

Although not particularly illustrated, the plug includes a plug center contact made of a conductive metal material positioned at the center in the radial direction, a plug shell positioned outside the plug center contact, and an insulating plug housing that is interspersed between the plug center contact and the plug shell. The plug is structured such that a plug-side insulator and the plug center contact are incorporated into the plug shell.

The socket 1 includes a socket center contact 2 positioned at the center in the radial direction, a socket fixing housing 3 fixed to a support body such as a board of electrical devices or a chassis, a socket movable housing 4 that can radially move together with the socket center contact 2 on a plug-side end face of the socket fixing housing 3, a socket fixing shell 5 that covers the outside of the socket fixing housing 3, and a socket movable shell 6 that covers the outside of the socket movable housing 4 and moves together with the socket movable housing 4. The plug center contact is connected with the socket center contact 2, while the plug shell is connected with the socket fixing shell 5.

The socket 1 includes a floating spring body 7 with one end fixed to the socket fixing housing 3 and the other end fixed to the socket movable housing 4. The floating mechanism is formed in such a way that the socket movable housing 4 is supported, together with the socket center contact 2, by the socket fixing housing 3 via the floating spring body 7.

The socket 1 also includes a conductive shell connecting unit that is interposed between the socket movable shell 6 and the socket fixing shell 5. The shell connecting unit connects the socket movable shell 6 and the socket fixing shell 5 in a constantly conductive state.

The socket 1 uses a floating spring body with a contact (hereafter referred to as an integral spring body 8) made of a conductive metal sheet formed by integrating the socket center contact 2 and the floating spring body 7, so that the socket center contact 2 can follow the movement of the socket movable housing 4.

Figure 3A:
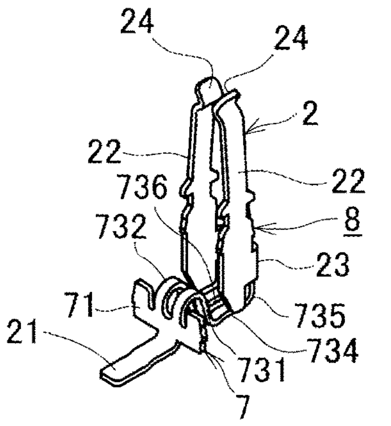
FIG. 3A is a perspective view showing an integral spring body including a center contact of the connector with a floating mechanism.
Figure 3B:
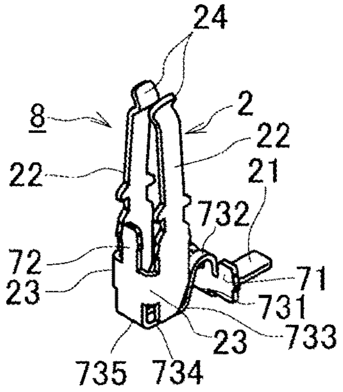
FIG. 3B is a perspective view showing the integral spring body including the center contact of the connector with a floating mechanism as viewed from a different direction.
Figure 3C:
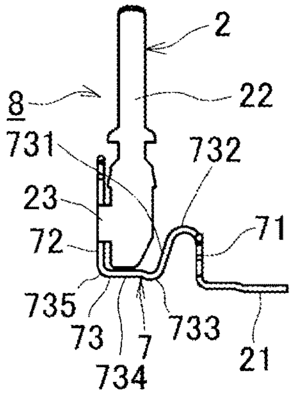
FIG. 3C is a side view showing the integral spring body including the center contact of the connector with a floating mechanism.

As shown in FIGS. 3A to 3C, the integral spring body 8 is integrally formed by punching and bending a conductive metal sheet having elasticity, and structured such that the floating spring body 7 integrally supports the socket center contact 2, and the floating spring body 7 serves as part of the configuration of the socket center contact 2.

The floating spring body 7 includes a support fixing part 71 that is fixed to the socket fixing housing 3, the floating fixing part 72 fixed to the socket movable housing 4, and an elastically deformable swing spring part 73 that couples the support fixing part 71 and the floating fixing part 72. The support fixing part 71 and the floating fixing part 72 are arranged in parallel to each other at an interval in a front-rear direction. With the elastic deformation of the swing spring part 73, the floating fixing part 72 can move forward and backward (a direction in which the support fixing part 71 and the floating fixing part 72 are arranged in parallel in the xy-plane) and swing left and right (a direction orthogonal to the forward and backward direction in the xy-plane) with respect to the support fixing part 71.

The support fixing part 71 is formed into a rectangular shape. The upper end of the support fixing part 71 supports one end of the swing spring part 73. From the lower end of the support fixing part 71, a board connecting terminal piece 21, constituting the socket center contact 2, extends in a horizontal direction.

The swing spring part 73 integrally includes an elastic expansion/contraction part 731 that is expandable and contractible in a direction between the support fixing part and the floating fixing part, that is, in a front-rear direction, and elastic twist parts that can twist around an axis in the direction between the support fixing part and the floating fixing part. The expansion and contraction of the elastic expansion/contraction part 731 allows forward and backward movement of the floating fixing part 72 relative to the support fixing part 71. The twist of each elastic twist part allows the movement of the floating fixing part 72 relative to the support fixing part 71 in a right-left direction, and allows return to its original position due to elasticity.

The upper end of the elastic expansion/contraction part 731 extends diagonally downward in the state of being supported by the upper edge of the support fixing part 71 via a folded part 732 that is curved in an arc shape, and the lower end of the elastic expansion/contraction part 731 integrally supports a horizontal support part 734 extending horizontally via a folded part 733.

The elastic expansion/contraction part 731 is curved at both the folded parts 732 and 733 so as to be able to expand and contract in the direction between the support fixing part and the floating fixing part, that is, in the front-rear direction, and return to its original position due to elasticity.

The horizontal support part 734 is formed into the shape of a horizontally extending thin plate, with one end being supported by the elastic expansion/contraction part 731 via the folded part 733, and the other end being integrally supported by the lower edge of the floating fixing part 72 via a folded part 735.

The respective folded parts 732, 733, and 735 are formed to have a plate width equal to or smaller than those of the support fixing part 71 and the floating fixing part 72, and constitute the elastic twist parts in the swing spring part 73.

Specifically, when the floating fixing part 72 moves with respect to the support fixing part 71 in the right-left direction, the respective folded parts 732, 733, and 735 twist around the axis in the direction between the support fixing part and the floating fixing part. This allows the movement in the right-left direction and allows return to the original position due to elasticity.

In the swing spring part 73, a slit 736 is formed in the direction between the support fixing part and the floating fixing part, so that both the side parts sandwiching the slit 736 can deform independently of each other. Accordingly, the respective folded parts 732, 733, and 735 can easily twist around the axis in the direction between the support fixing part and the floating fixing part.

The floating fixing part 72 is formed in a rectangular shape oriented in an up-down direction. Both the side parts of the floating fixing part 72 integrally support elastic clamping pieces 22 which constitute a connection part of the socket center contact 2.

The socket center contact 2 includes a connection part to be connected with the plug center contact, and the board connecting terminal piece 21 that is connected to a connection board. The connection part and the board connecting terminal piece 21 are electrically connected via the floating spring body 7.

The connection part includes a pair of elastic clamping pieces 22 that face each other in the right-left direction. The connection part connects with the plug center contact when a contact part of the pin-shaped plug center contact is held by both the elastic clamping pieces 22.

The elastic clamping pieces 22 are each formed into a band shape that is long in the up-down direction, with their lower side edges being integrally supported by support pieces 23 that are folded vertically from a lower end-side edge of the floating fixing part 72. The elastic clamping pieces 22 are arranged between the support fixing part 71 and the floating fixing part 72 so as to face each other in the right-left direction.

In addition, the respective elastic clamping pieces 22 have inwardly curved contacts 24 formed at the upper ends, so that the plug center contact is held between the contacts 24 that face each other.

Figure 4A:
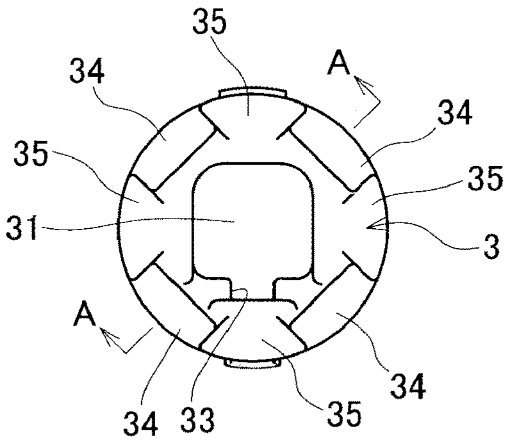
FIG. 4A is a plan view showing the socket fixing housing of the connector with a floating mechanism.
Figure 4B:
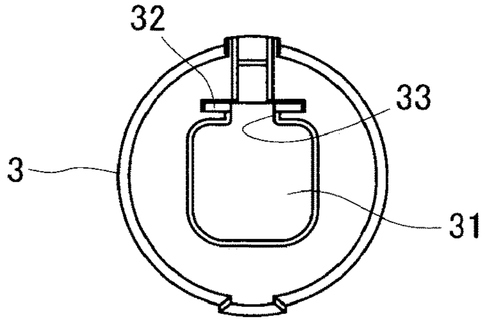
FIG. 4B is a bottom view showing the socket fixing housing of the connector with a floating mechanism.
Figure 4C:
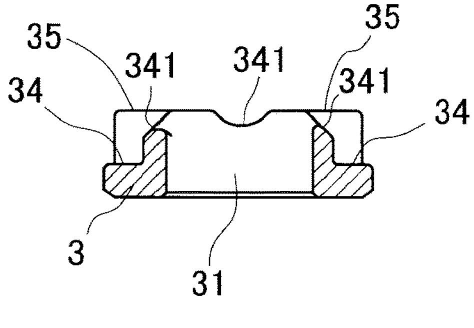
FIG. 4C is a cross-sectional view showing the socket fixing housing of the connector with a floating mechanism taken along an A-A arrow line.
Figure 5A:
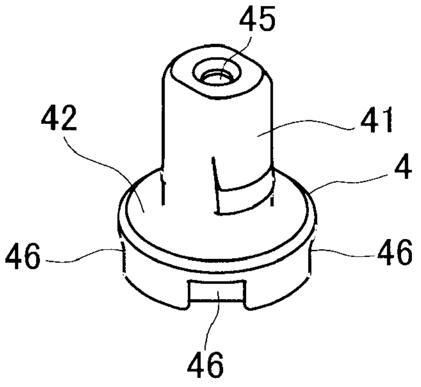
FIG. 5A is a perspective view showing the socket movable housing of the connector with a floating mechanism.
Figure 5B:
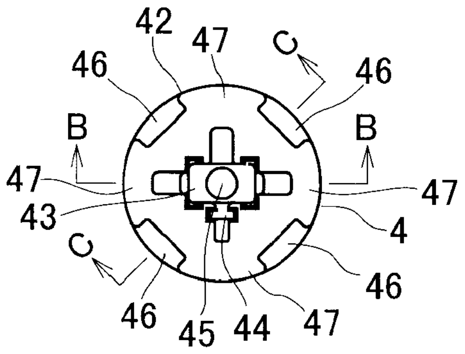
FIG. 5B is a bottom view showing the socket movable housing of the connector with a floating mechanism.
Figure 5C:
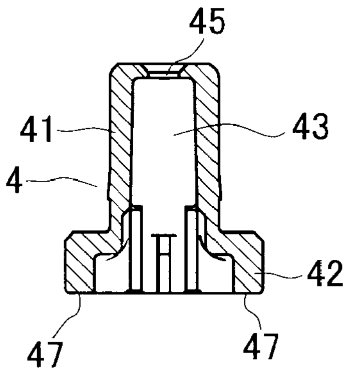
FIG. 5C is a cross-sectional view showing the socket movable housing of the connector with a floating mechanism taken along a B-B arrow line.
Figure 5D:
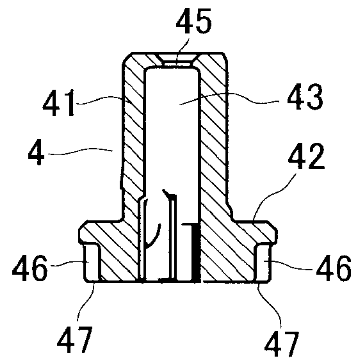
FIG. 5D is a cross-sectional view showing the socket movable housing of the connector with a floating mechanism taken along a C-C arrow line.

As shown in FIGS. 4A to 4C, the socket fixing housing 3 is formed of an insulating synthetic resin in a cylindrical shape having a contact housing part 31 that is opened up and down. From the upper face side, the socket movable shell 6, the socket movable housing 4 and the socket fixing shell 5 are sequentially assembled to the socket fixing housing 3, and from the lower face side, the integral spring body 8 is incorporated into the contact housing part 31. The socket movable housing 4 and the socket fixed housing 3 are movably joined via the floating spring body 7.

In the socket fixing housing 3, a support fixing part press-fitting part 32 oriented in the up-down direction is formed in an outer thickened part of the contact housing part 31. When the support fixing part 71 of the floating spring body 7 is press-fitted into the support fixing part press-fitting part 32, one end of the floating spring body 7, that is, the support fixing part 71, is fixed to the socket fixing housing 3.

The socket fixing housing 3 also has an avoidance groove 33 that is opened to the inside of the support fixing part press-fitting part 32 and communicates with the support fixing part press-fitting part 32, so as to avoid interference of the swing spring part 73.

Therefore, the lower parts of the floating fixing part 72 of the integral spring body 8 and both the elastic clamping pieces 22 are housed in the contact housing part 31 in a movable state, while being supported by the socket fixing housing 3 via the swing spring part 73, and the upper parts thereof project from an upper end opening of the contact housing part 31.

In addition, in the socket fixing housing 3, a plurality of floating recess parts 34, which are opened to the upper face and to the outside, are formed at intervals in the circumferential direction.

Between the floating recess parts 34 adjacent in the circumferential direction, a slip-down preventing part having a sliding support face 35 that is flush with the plug-side end face is also formed. At the time of floating, the sliding support face 35 supports a bottom face part of the socket movable housing 4 to prevent a bottom face edge part of the socket movable housing 4 from falling into the floating recess parts 34, so that the socket movable housing 4 can slide without inclining with respect to the socket fixing housing 3.

As shown in FIGS. 5A to 5D, the socket movable housing 4 has a disc-shaped flange part 42 that is integrally formed of an insulating resin so as to protrude outward at a lower end part of a cylindrical housing main body 41. Inside the socket movable housing 4, there is formed a rectangular hole-shaped contact housing part 43 that is opened to the lower face.

The socket movable housing 4 has a fixed part press-fitting hole 44 arranged in parallel to the contact housing part 43 and opened to the lower face. When the socket movable housing 4 is assembled to the upper face part of the socket fixing housing 3, an upper end part of the floating fixing part 72, projecting from the upper end of the socket fixing housing 3, is press-fitted into the fixed part press-fitting hole 44, and the connection part of the socket center contact 2, that is, the upper part of both the elastic clamping pieces 22 is housed in the contact housing part 31.

The socket movable housing 4 also includes a contact insertion hole 45 that is opened to the upper end face and communicates with the contact housing part 31. Through the contact insertion hole 45, the pin-shaped plug center contact is inserted into the contact housing part 31.

The flange part 42 are formed into a disc shape smaller in diameter than the socket fixing housing 3, and on its outer circumferential surface, a plurality of avoidance recess parts 46 that are opened to the lower face and to the outside are formed at intervals in the circumferential direction.

The respective avoidance recess parts 46 are arranged so as to correspond to the positions of the floating recess parts 34 formed in the socket fixing housing 3, and have a circumferential width that is formed to be narrower than the circumferential width of the avoidance recess parts 46.

The bottom face part of the socket movable housing 4 (flange part 42) is in the state of being notched by the avoidance recess parts 46 at its circumferential edge part. However, since the slip-down preventing part having the sliding support face 35 is provided between the floating recess parts 34 of the socket fixing housing 3, portions between the avoidance recess parts 46 adjacent in the circumferential direction (hereinafter referred to as sliding face edge parts 47) slide on the sliding support face 35 at the time of floating, so that the entire socket movable housing 4 is supported by the sliding support face 35 in a stable state.

Figure 6A:
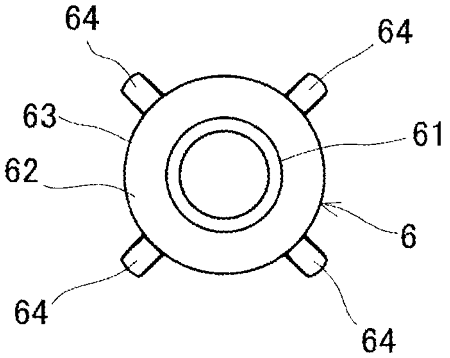
FIG. 6A is a plan view showing the socket movable shell of the connector with a floating mechanism.
Figure 6B:
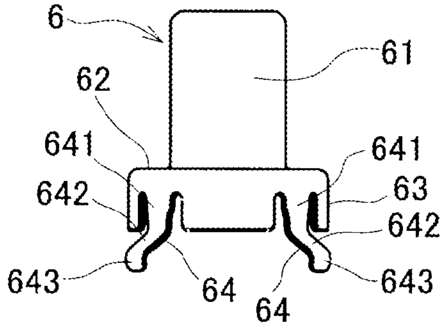
FIG. 6B is a front view showing the socket movable shell of the connector with a floating mechanism.
Figure 6C:
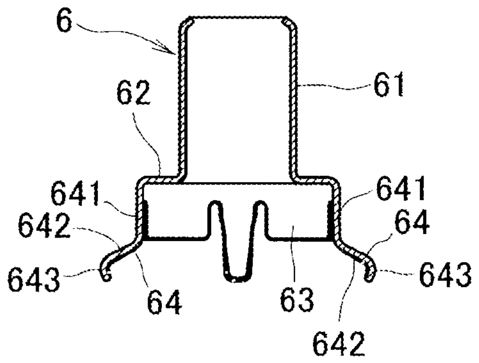
FIG. 6C is a cross-sectional view showing the socket movable shell of the connector with a floating mechanism taken along a D-D arrow line.

As shown in FIGS. 6A to 6C, the socket movable shell 6 is integrally formed by press-working of a conductive metal sheet. The socket movable shell 6 includes a main body cylindrical part 61 in a cylindrical shape, an upper face covering part 62 protruding outward from the lower end of the main body cylindrical part 61, and a cylindrical flange outer circumference covering part 63 that is integrally supported by the outer circumferential edge of the upper face covering part 62, and is formed in a stepped cylindrical shape having a diameter enlarged part at its lower end part.

The socket movable shell 6 is assembled to and integrated with the socket movable housing 4 from above. The main body cylindrical part 61 covers the outer circumference of the housing main body 41. The upper face covering part 62 covers the upper face of the flange part 42. The flange outer circumference covering part 63 covers the outer circumference of the flange part 42. Specifically, the entire socket movable housing 4 is covered with the socket movable shell 6 made of a conductive material.

In the following description, for the sake of convenience, the socket movable housing 4 integrated with the socket movable shell 6 is referred to as a movable housing body. Unless otherwise described, the housing main body 41 refers to the housing main body 41 covered with the main body cylindrical part 61, and the flange part 42 refers to the flange part 42 covered with the upper face covering part 62 and the flange outer circumference covering part 63.

The socket movable shell 6 includes the plurality of elastic contact pieces 64 that project radially from an outer circumferential part of the flange outer circumference covering part 63. The elastic contact pieces 64 are interposed between the socket movable shell 6 and the socket fixing shell 5 and constitutes the shell connecting unit that connects the socket movable shell 6 and the socket fixing shell 5 in a constantly conductive state.

In this example, the respective elastic contact pieces 64 project in four directions at intervals of 90 degrees in the circumferential direction. The elastic contact pieces 64 are preferably provided at least three locations at equal intervals in the circumferential direction.

The elastic contact pieces 64 each include a base end part 641 on the outer circumferential surface of the flange part 42, an inclination part 642 extending diagonally downward at the outer side from the lower end of the base end part 641, and a contact part 643 formed at the tip of the inclination part 642. The elastic contact pieces 64 are each formed into the shape of a cantilever plate spring.

The respective elastic contact pieces 64 are set so that their horizontal protrusion distance is larger than a gap between the outer circumferential surface of the flange part 42 of the movable housing body and the inner circumferential surface of the socket fixing shell 5. Even when the movable housing body moves on the socket fixing housing 3, any of the elastic contact pieces 64 is constantly in contact with the inner circumferential surface of the socket fixing shell 5 at a contact pressure equal to or more than a prescribed contact pressure.

The socket movable shell 6 is assembled to the socket movable housing 4 in such a way that the positions of the avoidance recess parts 46 formed on the outer circumferential surface of the flange part 42 of the socket movable housing 4 match the positions of the respective elastic contact pieces 64.

The avoidance recess parts 46 each have a width (circumferential width) wider than the width of the elastic contact pieces 64, and a diametric depth sufficient enough to ensure deformation of the elastic contact pieces 64. This prevents interference between the elastic contact pieces 64 and the flange part 42 when the elastic contact pieces 64 are elastically deformed.

Figure 8A:
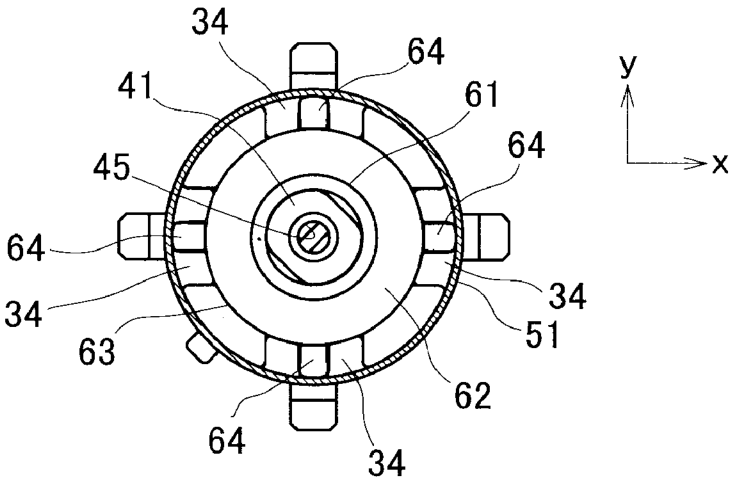
FIG. 8A is a partially cutaway plan view showing the connector with a floating mechanism at a neutral position to illustrate its operation.
Figure 8B:
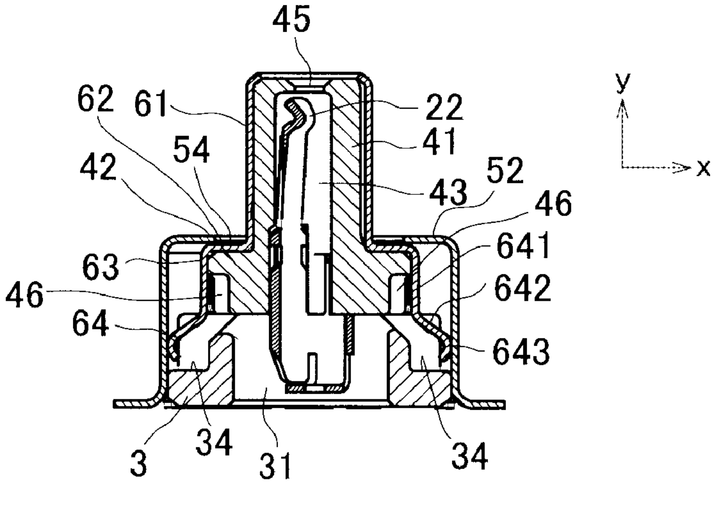
FIG. 8B is a longitudinal cross-sectional view showing the connector with a floating mechanism at a neutral position to illustrate its operation.
Figure 9A:
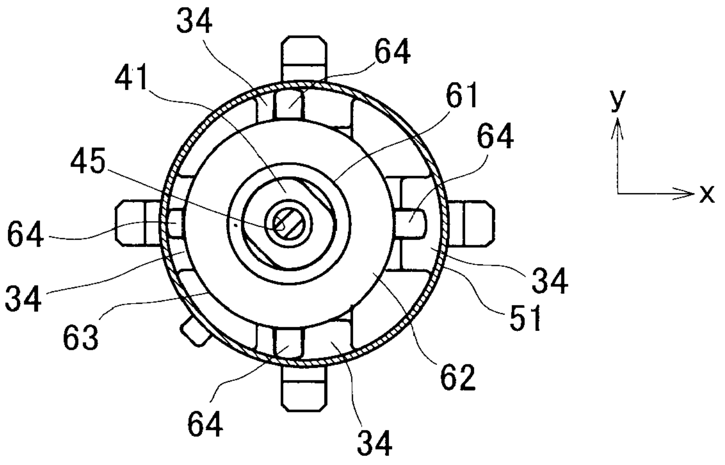
FIG. 9A is a partially cutaway plan view showing the connector with a floating mechanism displaced in an x direction.
Figure 9B:
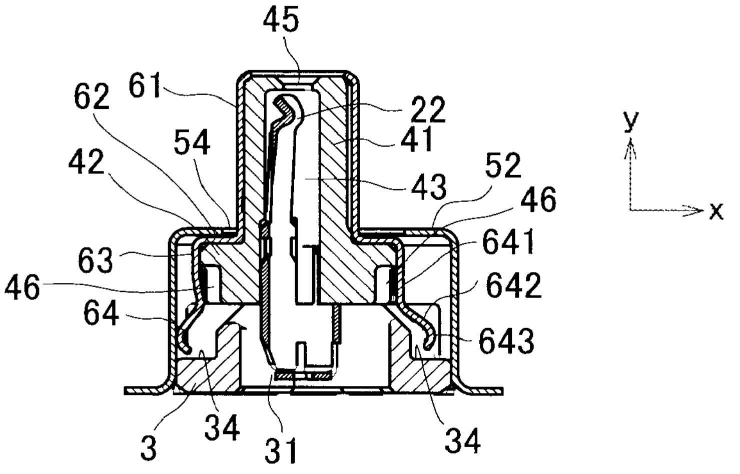
FIG. 9B is a longitudinal cross-sectional view showing the connector with a floating mechanism displaced in an x direction.
Figure 10A:
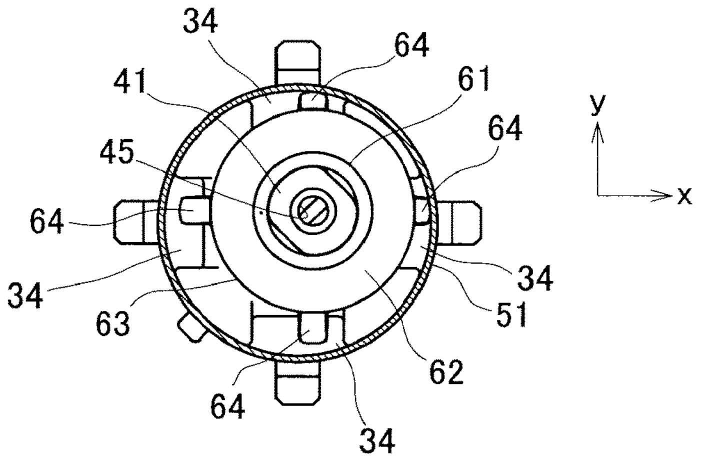
FIG. 10A is a partially cutaway plan view showing the connector with a floating mechanism displaced in xy directions.
Figure 10B:
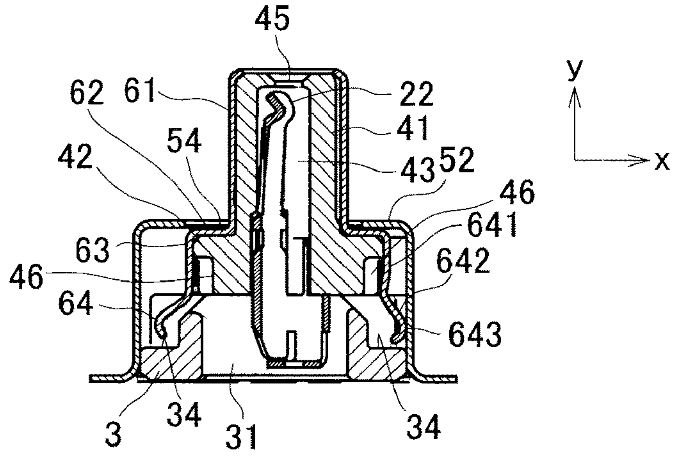
FIG. 10B is a longitudinal cross-sectional view showing the connector with a floating mechanism displaced in xy directions.

As shown in FIGS. 8A and 8B, the movable housing body is incorporated in such a way that the lower face of the flange part 42 is mounted on the upper end face of the socket fixing housing 3. At that time, the respective elastic contact pieces 64 are inserted into the floating recess parts 34.

The width, height, and depth of the floating recess parts 34 are secured, in consideration of maximum displacement in design, so that the elastic contact pieces 64 do not come into contact with the socket fixing housing 3 even when the elastic contact pieces 64 are displaced by the maximum displacement and elastically deformed.

In addition, circular arc-shaped notch parts 341 are formed so as to be oriented in a diagonal direction, at the upper edges of the wall parts of the floating recess parts 34 that are on the side of the contact housing part 31. The notch parts 341 ensure that the elastic contact pieces 64 do not interfere with the socket fixing housing 3 even when the movable housing body moves.

Figure 7A:
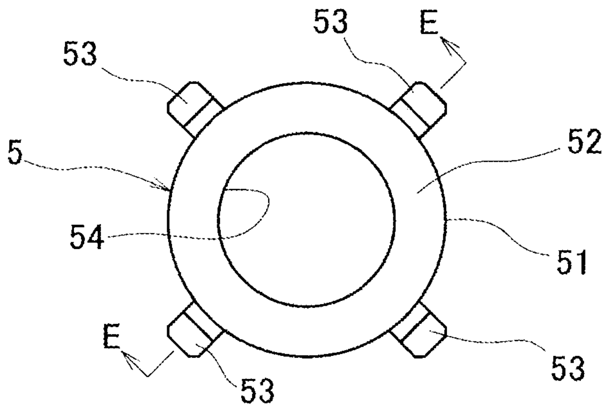
FIG. 7A is a plan view showing the socket fixing shell of the connector with a floating mechanism.
Figure 7B:
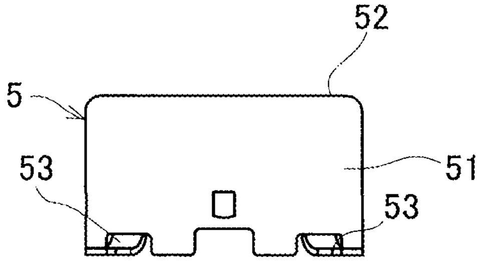
FIG. 7B is a front view showing the socket fixing shell of the connector with a floating mechanism.
Figure 7C:
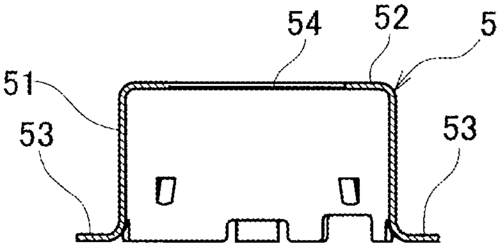
FIG. 7C is a cross-sectional view showing the socket fixing shell of the connector with a floating mechanism taken along an E-E arrow line.

As shown in FIGS. 7A to 7C, the socket fixing shell 5 is integrally formed by drawing of a conductive metal material. The socket fixing shell 5 includes a seamless cylindrical outer circumferential wall part 51 that covers an outer circumference of the socket fixing housing 3, an annular upper face shielding part 52 that is integrally supported on the upper edge of the outer circumferential wall part 51 to cover an upper face circumferential edge of the socket fixing housing 3, and a plurality of board connection parts 53 protruding outward at the bottom edge of the outer circumferential wall part 51.

The outer circumferential wall part 51 is formed into a cylindrical shape that is higher, by the thickness of the flange part 42 (the flange part 42 and the upper face covering part 62) of the movable housing body, than the thickness of the socket fixing housing 3 in a cylindrical axis direction and that is approximately equal in diameter to the socket fixing housing 3.

The upper face shielding part 52 has an opening part 54 at the center in the radial direction, the opening part 54 being larger in diameter than the housing main body 41 of the movable housing body and smaller in diameter than the flange part 42.

The socket fixing shell 5 is electrically connected (GND connected) to a mounting board by soldering the board connection parts 53 to a pattern on the mounting board that is a support body.

The socket fixing shell 5 is made to cover the flange part 42 and the socket fixing housing 3 from their upper face side, while the housing main body 41 of the movable housing body projects from the opening part 54, so that the flange part 42 of the movable housing body is movably housed in between the end face of the socket movable housing 4 and the upper face shielding part 52.

In addition, when the socket fixing shell 5 is assembled, each of the elastic contact pieces 64 of the movable housing body comes into contact with an inner circumferential surface of the outer circumferential wall part 51 of the socket fixing shell 5. As a result, the inner circumferential surface of the outer circumferential wall part 51 presses each of the elastic contact pieces 64 inward, so that the movable housing body is centered at approximately the center of the socket fixing housing 3.

In the connector with a floating mechanism configured as above, when a plug and the socket 1 are interconnected, the movable housing body is movably supported on the socket fixing housing 3 via the floating spring body 7, and moves together with the socket center contact 2. Accordingly, even when axial deviation with respect to the plug occurs in any of the front-rear direction and the right-left direction (xy directions) at the time of interconnection, the axial deviation is automatically adjusted. As a result, the plug center contact is inserted into the contact insertion hole 45 of the movable housing body, and the plug center contact and the socket center contact 2 are connected.

At this time, since the socket fixing shell 5 is connected to the ground, and the respective elastic contact pieces 64 that constitute the shell connecting unit put the socket fixing shell 5 and the socket movable shell 6 in a constantly conductive state, the entire socket 1 that receives insertion of the plug center contact is covered with the socket movable shell 6 and the socket fixing shell 5 that are connected to the ground almost without any gap, and high EMC characteristics can thus be obtained.

Specifically, when the plug and the socket 1 are connected without misalignment as shown in FIGS. 8A and 8B, the respective elastic contact pieces 64 are in contact with the inner circumferential surface of the socket fixing shell 5 at a prescribed contact pressure. When the displacement in the xy directions is small, the respective elastic contact pieces 64 are maintained in this state.

Figure 11A:
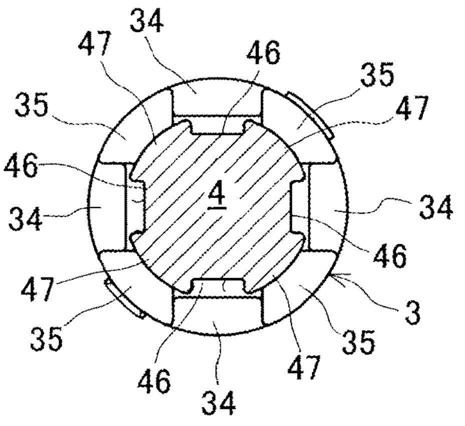
FIG. 11A is a partially cutaway transverse cross-sectional view simplified for illustrating the positional relation between the socket fixing housing and the socket movable housing in the connector with a floating mechanism, showing the state in the neutral position shown in FIGS. 8A and 8B.
Figure 11B:
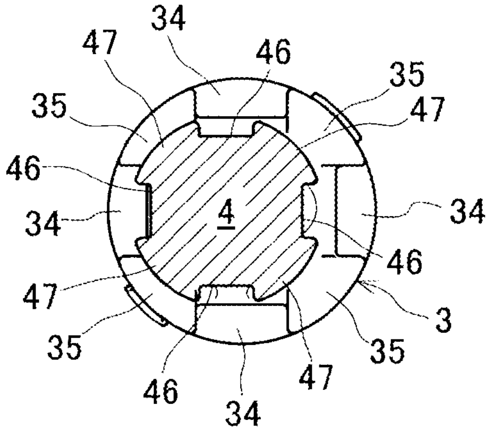
FIG. 11B is a partially cutaway transverse cross-sectional view simplified for illustrating the positional relation between the socket fixing housing and the socket movable housing in the connector with a floating mechanism, showing the state displaced in the x-direction shown in FIGS. 9A and 9B
Figure 11C:
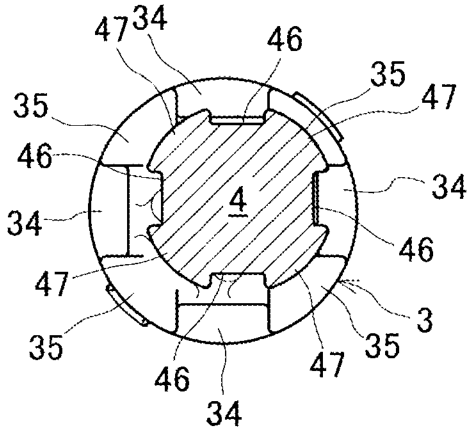
FIG. 11C is a partially cutaway transverse cross-sectional view simplified for illustrating the positional relation between the socket fixing housing and the socket movable housing in the connector with a floating mechanism, showing the state displaced in the xy-directions shown in FIGS. 9A and 9B.

In this state, as shown in FIG. 11A, the sliding face edge part 47 is positioned on the sliding support face 35 which constitutes the upper face of the slip-down preventing part arranged between the floating recess parts 34 of the socket fixing housing 3, so that the socket movable housing 4 is mounted on the socket fixing housing 3 in a stable state.

On the other hand, when a large misalignment occurs between the plug and the socket 1 in the x direction and the y direction as shown in FIGS. 9A, 9B, 10A and 10B, the elastic contact pieces 64, projecting in the direction orthogonal to the displacement direction, move inside the floating recess parts 34 in the width direction. Since ones of the elastic contact pieces 64 projecting in the displacement direction are pressed by the socket fixing shell 5 and deflect, the movable housing body can be displaced in that direction.

In this case, even when the elastic contact pieces 64 on the opposite side of the displacement direction are detached from the inner circumferential surface of the socket fixing shell 5, at least the elastic contact pieces 64 at two locations remain in contact with the inner circumferential surface of the socket fixing shell 5, and conduction between the socket movable shell 6 and the socket fixing shell 5 is thus constantly maintained.

In the case of floating as shown in FIGS. 9A, 9B, 10A and 10B, since the sliding face edge part 47 between the avoidance recess parts 46 slide on the sliding support face 35 positioned between the floating recess parts 34, the entire socket movable housing 4 is supported by the sliding support face 35 in a stable state, so that the bottom face edge part of the socket movable housing 4 does not fall into the floating recess parts 34, and the socket movable housing 4 can slide on the socket fixing housing 3 without inclining.

In the above-described examples, the case where the shell connecting unit is constituted of the plurality of elastic contact pieces 64 that are radially projecting from the outer circumferential part of the socket movable shell 6 has been described. However, the aspect of the shell connecting unit is not limited to this. For example, a spring piece projecting from an inner circumferential part of the socket fixing shell 5 toward the socket movable shell 6 may be used, or a coil spring made of a conductive material may be interposed between the outer circumferential surface of the socket movable shell 6 (flange outer circumference covering part 63) and the inner circumferential surface of the socket fixing shell 5.

In addition, the shell connecting unit may be configured to allow sliding while the upper face covering part 62 that covers the upper face of the flange part 42 is in contact with the upper face shielding part 52 of the socket fixing shell 5.

Figure 12:
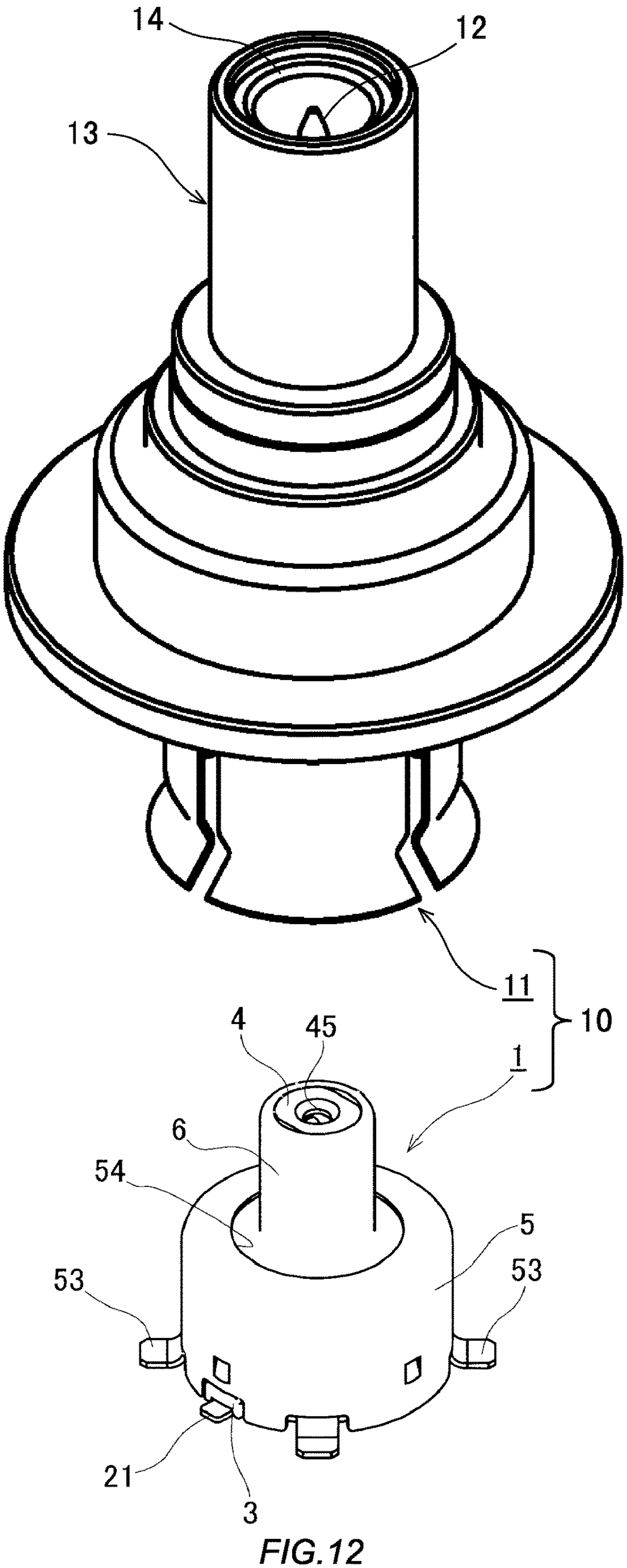
FIG. 12 is a perspective view showing an example of a connector with a floating mechanism comprising a plug and the socket.

FIG. 12 is a perspective view showing a connector with a floating mechanism 10 comprising a plug 11 and the socket 1. The connector with a floating mechanism 10 is an example of the connector with a floating mechanism. A plug center contact 12 is an example of the plug center contact of the above embodiment. A plug shell 13 is an example of the plug shell of the above embodiment. A plug housing 14 is the plug housing of the above embodiment.

REFERENCE SIGNS LIST

1 socket
10 connector with a floating mechanism
11 plug
12 plug center contact
13 plug shell
14 plug housing
2 socket center contact
21 board connecting terminal piece
22 elastic clamping piece
23 support piece
24 contact
3 socket fixing housing
31 contact housing part
32 support fixing part press-fitting part
33 avoidance groove
34 floating recess part
35 sliding support face
4 socket movable housing
41 housing main body
42 flange part
43 contact housing part
44 fixed part press-fitting hole
45 contact insertion hole
46 avoidance recess part
47 sliding face edge part
5 socket fixing shell
51 outer circumferential wall part
52 upper face shielding part
53 board connection part
54 opening part
6 socket movable shell
61 main body cylindrical part
62 upper face covering part
63 flange outer circumference covering part
64 elastic contact piece
641 base end part
642 inclination part
643 contact part
7 floating spring body
71 support fixing part
72 floating fixing part
73 swing spring part
731 elastic expansion/contraction part
732 folded part
733 folded part
734 horizontal support part
735 folded part
736 slit
8 integral spring body

The invention claimed is:

1. A socket for a connector with a floating mechanism, the connector with the floating mechanism being a coaxial connector including the socket configured to be connected with a plug:
the socket including
a socket center contact,
a socket fixing housing configured to be fixed to a support,
a socket movable housing configured to be radially movable on a plug-side end face of the socket fixing housing together with the socket center contact, and
a socket fixing shell configured to cover an outside of the socket fixing housing;
the socket center contact being configured to be connected with a plug center contact of the plug while the socket fixing shell is configured to be connected with a plug shell positioned outside the plug center contact in the plug;
the connector with the floating mechanism comprising:
a socket movable shell configured to cover an outside of the socket movable housing and to move together with the socket movable housing; and
a conductive shell connecting unit configured to constantly provide connection between the socket movable shell and the socket fixing shell, the shell connecting unit being interposed between the socket movable shell and the socket fixing shell.

2. The socket for the connector with the floating mechanism according to claim 1, wherein:

the socket movable housing includes a flange part configured to protrude outward at a lower end part of a cylindrical housing main body; and the socket movable shell integrally includes a main body cylindrical part configured to cover an outer circumference of the housing main body and an upper face covering part configured to protrude outward from a lower end of the main body cylindrical part to cover an upper face of the flange part.

3. The socket for the connector with the floating mechanism according to claim 2, wherein the socket movable shell includes a flange outer circumference covering part configured to be integrally supported by an outer circumferential edge of the upper face covering part to cover an outer circumference of the flange part.

4. The socket for the connector with the floating mechanism according to claim 1, wherein:

the shell connecting unit is constituted of a plurality of elastic contact pieces configured to radially project from an outer circumferential part of the socket movable shell; and contact parts formed at tips of the respective elastic contact pieces are made to come into contact with an inner circumferential surface of the socket fixing shell.

5. The socket for the connector with the floating mechanism according to claim 4, wherein the socket fixing housing has floating recess parts formed so as to open to an upper face and to outside and to allow insertion of the elastic contact pieces in a movable manner.

6. The socket for the connector with the floating mechanism according to claim 4, wherein the socket movable housing has avoidance recess parts formed on an outer circumferential surface to allow deformation of the elastic contact pieces.

7. The socket for the connector with the floating mechanism according to claim 5, wherein:

the socket fixing housing has a slip-down preventing part formed to have a sliding support face that is flush with the plug-side end face between the floating recess parts adjacent in a circumferential direction; and the sliding support face supports a bottom face part of the socket movable housing at a time of floating so as to prevent the socket movable housing from falling into the floating recess parts.

8. The connector with the floating mechanism, comprising:

the socket according to claim 1; and the plug including the plug center contact, the plug shell, and plug housing configured to be interspersed between the plug center contact and the plug shell.

9. The connector with the floating mechanism according to claim 8, wherein:

the socket movable housing includes a flange part configured to protrude outward at a lower end part of a cylindrical housing main body; and the socket movable shell integrally includes a main body cylindrical part configured to cover an outer circumference of the housing main body and an upper face covering part configured to protrude outward from a lower end of the main body cylindrical part to cover an upper face of the flange part.

10. The connector with the floating mechanism according to claim 9, wherein the socket movable shell includes a flange outer circumference covering part configured to be integrally supported by an outer circumferential edge of the upper face covering part to cover an outer circumference of the flange part.

11. The connector with the floating mechanism according to claim 8, wherein:

the shell connecting unit is constituted of a plurality of elastic contact pieces configured to radially project from an outer circumferential part of the socket movable shell; and contact parts formed at tips of the respective elastic contact pieces are made to come into contact with an inner circumferential surface of the socket fixing shell.

12. The connector with the floating mechanism according to claim 11, wherein the socket fixing housing has floating recess parts formed so as to open to an upper face and to outside and to allow insertion of the elastic contact pieces in a movable manner.

13. The connector with the floating mechanism according to claim 11, wherein the socket movable housing has avoidance recess parts formed on an outer circumferential surface to allow deformation of the elastic contact pieces.

14. The socket for the connector with the floating mechanism according to claim 12, wherein:

the socket fixing housing has a slip-down preventing part formed to have a sliding support face that is flush with the plug-side end face between the floating recess parts adjacent in a circumferential direction; and the sliding support face supports a bottom face part of the socket movable housing at a time of floating so as to prevent the socket movable housing from falling into the floating recess parts.

* * * * *